United States Patent [19]
Ito et al.

[11] Patent Number: 5,914,755
[45] Date of Patent: *Jun. 22, 1999

[54] IMAGE TRANSMISSION APPARATUS

[75] Inventors: Kazuhiko Ito, Yokohama; Eiichi Sato, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/599,241

[22] Filed: Feb. 9, 1996

[30] Foreign Application Priority Data

Feb. 17, 1995 [JP] Japan ................................ 7-029590

[51] Int. Cl.$^6$ ........................................ H04N 7/18
[52] U.S. Cl. ...................... 348/552; 348/13; 348/211; 348/439
[58] Field of Search ................................ 348/384, 391, 348/439, 552, 211, 13; 358/527; H04N 7/18

[56] References Cited

U.S. PATENT DOCUMENTS

5,249,164  9/1993  Koz ........................................ 348/552
5,485,283  1/1996  Kaneko ................................ 358/527

Primary Examiner—Howard W. Britton
Attorney, Agent, or Firm—Fitzpatrick, Cella, Harper & Scinto

[57] ABSTRACT

An image transmission apparatus of this invention generates an image signal for one field at a first rate, forms a first transmission image signal on the basis of the generated image signal, outputs the formed first transmission image signal for one field at a second rate lower than the first rate, forms a second transmission image signal having a smaller information volume than that of the first transmission image signal on the basis of the generated image signal, outputs the formed second transmission image signal for one field at a rate higher than the second rate, and selectively outputs one of the output first and second transmission image signals onto a transmission path, thereby providing, by a simple arrangement, an image transmission apparatus, which can selectively transmit an image signal onto a transmission path at one of different arbitrary rates in correspondence with an application purpose or display mode independently of the transmission rate of the transmission path, can display an image represented by an image signal transmitted from a transmitting apparatus in real time, and can assure low cost, low consumption power, and good operability.

49 Claims, 7 Drawing Sheets

IMAGE TRANSMISSION APPARATUS

BACKGROUND OF THE INVENTION

1. Field of the Invention

The present invention relates to an image transmission apparatus and, more particularly, to an apparatus for transmitting image data via a transmission path or interface with a low data transmission rate.

2. Related Background Art

As a conventional apparatus for recording information corresponding to a natural image on a recording medium in the state of an analog signal, an electronic still video camera, a camera built-in type video tape recorder, and the like are known.

However, in recent years, since digital information equipments such as personal computers, and the like have become popular, a demand has arisen for a digital image input apparatus which can directly input information corresponding to a natural image to these digital equipment in the state of a digital signal.

Figure 1:
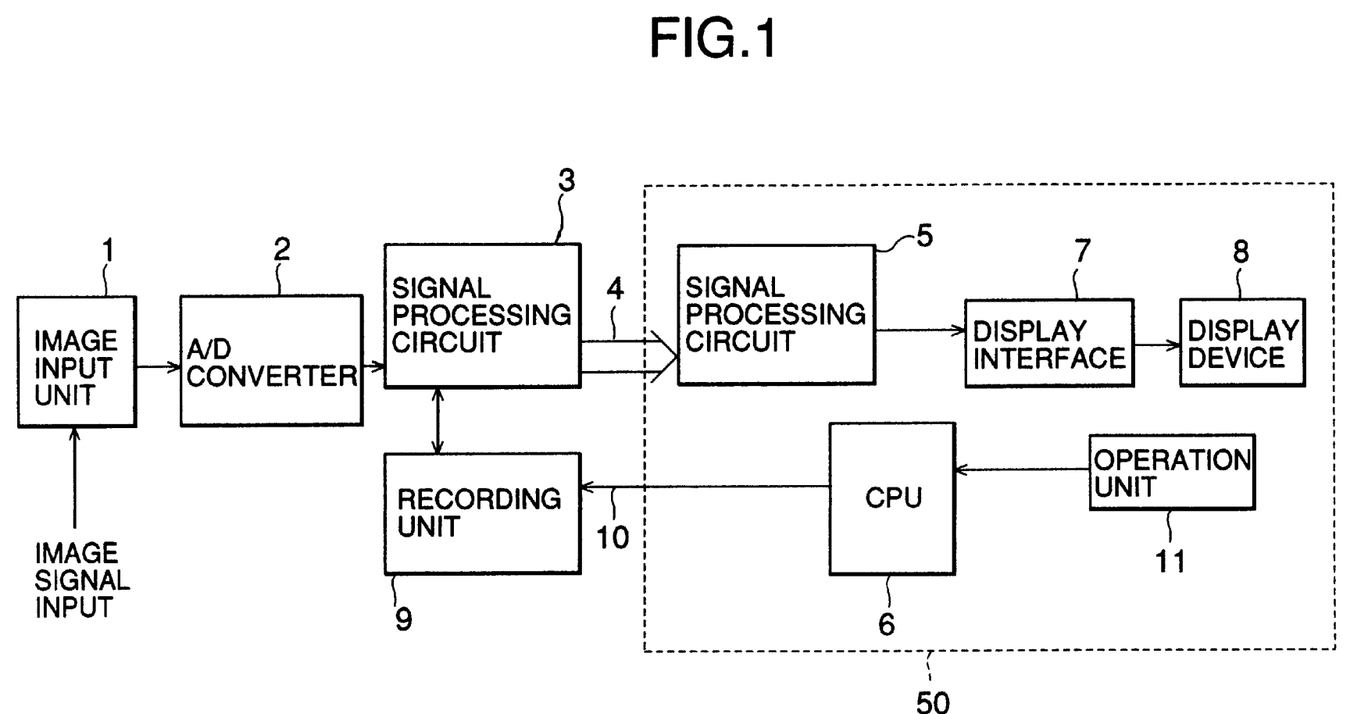
FIG. 1 is a schematic block diagram showing the arrangement of a conventional digital image input system.

FIG. 1 is a schematic block diagram showing the arrangement of a conventional digital image input system.

Referring to FIG. 1, the image input system comprises an image input unit 1 for inputting an image signal, an A/D converter 2, a signal processing circuit 3, a transmission path 4, a signal processing circuit 5 which is arranged at the reception side of a signal transmitted via the transmission path 4 and has a memory capable of storing digital image data for one field, a CPU 6 of a computer, a display interface 7 for outputting a signal to a display device, a display device 8 having a display unit such as a CRT, a liquid crystal display, or the like, a recording unit 9 such as a digital video tape recorder, a digital video disk device, or the like, which stores image data on a recording medium, a command signal line 10 for transmitting a command signal, which is output from the CPU 6 to instruct, e.g., the start of the recording operation, to the recording unit 9, and an operation unit 11 used by an operator to input, e.g., the start command of the recording operation to the CPU 6.

Note that the signal processing circuit 5, the CPU 6, the display interface 7, the display device 8, and the operation unit 11 are arranged as a personal computer system 50.

The conventional image input system will be described below with reference to FIG. 1.

The operation executed when an analog image signal is input, an image represented by the input analog image signal is displayed on the display unit of the display device 8 in the personal computer system 50, and an operator arbitrarily records his or her desired scene of the input analog image signal on the recording medium while confirming the contents of the image, in FIG. 1, will be described below.

Referring to FIG. 1, the image input unit 1 inputs an analog image signal to the system.

As an image signal input to the image input unit 1, for example, when a video signal compatible with the NTSC television system is to be input, a video signal having 60 fields per second is input; when a video signal compatible with the PAL television system is to be input, a video signal having 50 fields per second is input.

Of the video signal input by the image input unit 1, a video signal for, e.g., one field is sampled by the A/D converter 2 at a sampling rate of about 640 samples in the horizontal direction×480 samples in the vertical direction, and each sample is analog-to-digital converted to have 8-bit or higher gradation characteristics for each of R, G, and B colors, thus forming digital image data. The formed digital image data is always supplied to the recording unit 3 via the signal processing circuit 3, and is modulated by the circuit 3 to have a signal format (e.g., an FM-modulated signal) suitable for transmission along the transmission path 4. Furthermore, the digital image data is subjected to transmission rate conversion processing by the circuit 3 to match the transmission rate of the transmission path 4. Thereafter, the digital image data is transmitted to the personal computer system 50.

As the transmission path 4, a transmission path with a low transmission rate such as a versatile serial interface such as an RS-232C interface, a telephone line, and the like is normally used. For this reason, the transmission rate conversion processing performed by the signal processing circuit 3 is one for lowering the transmission rate of the digital image data supplied from the A/D converter 2.

The transmitted digital image data is subjected to processing, e.g., demodulation or the like, in the signal processing circuit 5 in the personal computer system 50, and is temporarily stored in the internal memory of the signal processing circuit 5. Thereafter, the digital image data is read out from the memory, and is converted by the display interface 7 to have a signal format such as R, G, and B signals, that can be displayed by the display device 8. The converted image data is displayed on the display unit such as a CRT, a liquid crystal display, or the like, of the display device 8.

As described above, the display device 8 of the personal computer system 50 displays an image represented by the analog image signal input to the system, and the operator confirms the contents of the image represented by the image signal input to the system on the basis of the displayed image on the display device 8. The operator then operates the operation unit 11 to supply a start command of the recording operation for recording the currently input image signal on the recording medium to the CPU 6. The CPU 6 outputs a command signal for instructing the start of the recording operation, and the signal is input to the recording unit 9 via the command signal line 10.

Note that the recording unit 9 always receives digital image data from the signal processing circuit 3, which data is one before being converted to have a signal format suitable for transmission along the transmission path 4. The recording unit 9 records the digital image data supplied from the signal processing circuit 3 in accordance with the command signal transmitted from the CPU 6.

Since the digital image data recorded on the recording medium by the recording unit 9 is one before being converted to have a signal format suitable for transmission along the transmission path 4, it is a signal having a large information volume per field and a high transmission rate. The recording unit 9 has a performance capable of recording digital image data for one field in 1/60 seconds at high speed.

The above-mentioned conventional digital image input system allows the operator to record an image signal representing a required scene of the input image signal on the recording medium while confirming the contents of the input image signal. Therefore, in order to allow the contents of the image signal input to the system to be confirmed on the display device of the personal computer, the input image signal is converted into a format suitable for transmission along a versatile transmission path with a low transmission rate, and the converted signal is supplied to the personal computer system via the versatile transmission path.

Therefore, when a color dynamic image signal having a large information volume per field and a high transmission rate is input to the system, since the versatile transmission path has a very low transmission rate that can transmit only an image signal for one field in, e.g., 5 seconds, an image displayed on the display device of the personal computer is an unnatural image (e.g., the color still image is switched every 5 seconds), far from a dynamic image. For this reason, even when the operator observes the displayed image, he or she cannot accurately confirm the contents of the image signal currently input to the system.

Since the operator cannot accurately confirm the contents of the image signal currently input to the system even when he or she observes the image displayed on the display device of the personal computer system, he or she cannot give a recording operation start instruction to the recording unit at an adequate timing, and cannot arbitrarily record an image signal corresponding to his or her desired scene on the recording medium.

In the conventional digital image input system, for example, when a video camera is connected to the image input unit, a picked-up image signal output from the video camera is input to the system, and the operator arbitrarily records an image signal corresponding to his or her desired scene on the recording medium while confirming the image picked up by the video camera, the operator cannot operate viewfinder functions such as setting and confirmation of the framing, zoom ratio, and focusing state of an image picked up by the video camera, setting and confirmation of the layout of the picked-up image, and the like on the display screen of the display device in the personal computer system in real time.

In order to match the image display rate with the transmission rate of the image signal, a special-purpose transmission path having a high transmission rate may be used in place of the versatile transmission path, or a compression processing circuit, which can reduce the information volume at high speed without impairing the image quality of an image signal, may be used, and the input image signal may be subjected to compression processing by the compression processing circuit so as to transmit the image data with a small information volume. However, in any case, the cost increases, and the system itself becomes very expensive.

SUMMARY OF THE INVENTION

It is an object of the present invention to provide an image transmission apparatus which can solve the above-mentioned problems.

It is another object of the present invention to provide an image transmission apparatus, which requires low cost and low consumption power, and is easy to operate since it can selectively transmit an image signal onto a transmission path at one of different arbitrary rates corresponding to application purposes regardless of the transmission rate of the transmission path, and can display an image represented by the image signal transmitted from the transmitting side in real time with a simple arrangement.

In order to achieve the above objects, according to one aspect of the present invention, there is provided an image transmission apparatus comprising image signal generation means for generating an image signal for one field at a first rate, first transmission image signal forming means for forming a first transmission image signal on the basis of the image signal generated by the image signal generation means, and outputting the formed first transmission image signal for one field at a second rate lower than the first rate, second transmission image signal forming means for forming a second transmission image signal having an information volume smaller than an information volume of the first transmission image signal on the basis of the image signal generated by the image signal generation means, and outputting the formed second transmission image signal for one field at a rate higher than the second rate, and selective output means for selectively outputting one of the first transmission image signal output from the first transmission image signal forming means and the second transmission image signal output from the second transmission image signal forming means onto a transmission path.

It is still another object of the present invention to provide an image transmission apparatus, which requires low cost and low consumption power, and is easy to operate since it can selectively transmit an image signal onto a transmission path at one of different arbitrary rates corresponding to display modes regardless of the transmission rate of the transmission path, and can display an image represented by the image signal transmitted from the transmitting side in real time with a simple arrangement.

In order to achieve the above object, according to one aspect of the present invention, there is provided an image transmission apparatus comprising image signal generation means for generating an image signal for one field at a first rate, first transmission image signal forming means for forming a first transmission image signal on the basis of the image signal generated by the image signal generation means, and outputting the formed first transmission image signal for one field at a second rate lower than the first rate, second transmission image signal forming means for forming a second transmission image signal having an information volume smaller than an information volume of the first transmission image signal on the basis of the image signal generated by the image signal generation means, and outputting the formed second transmission image signal for one field at a rate higher than the second rate, selective output means for selectively outputting one of the first transmission image signal output from the first transmission image signal forming means and the second transmission image signal output from the second transmission image signal forming means onto a transmission path, a transmission path for transmitting the transmission image signal output from the selective output means, and display means for displaying an image corresponding to one of the first and second transmission signals transmitted via the transmission path.

The above and other objects and features of the present invention will become apparent from the following detailed description of the present invention taken in conjunction with the accompanying drawings.

DETAILED DESCRIPTION OF THE PREFERRED EMBODIMENTS

Figure 2:
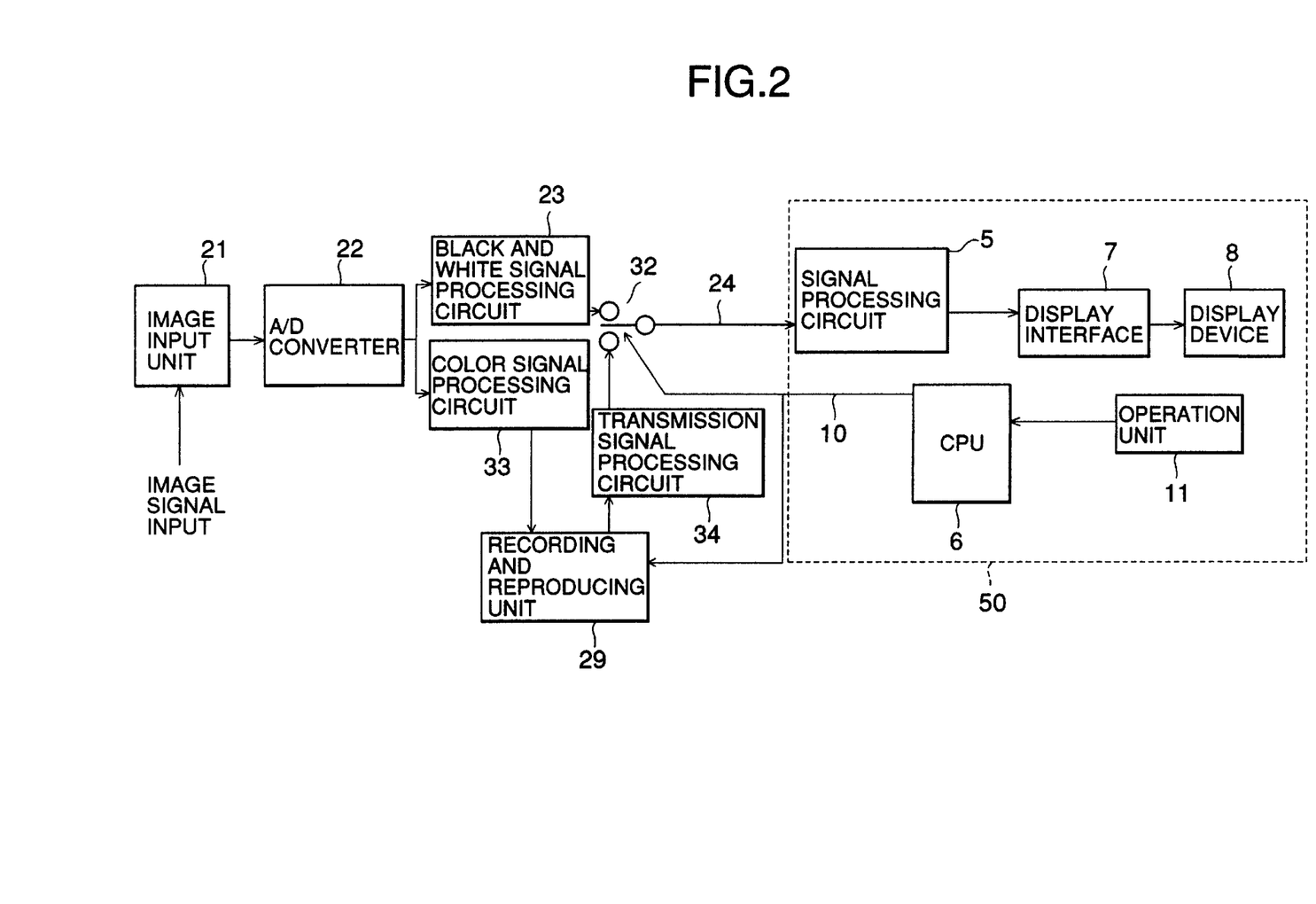
FIG. 2 is a schematic block diagram showing the arrangement of a digital image input system according to the first embodiment of the present invention.

FIG. 2 is a schematic block diagram showing the arrangement of a digital image input system according to the first embodiment of the present invention.

Note that the same reference numerals in FIG. 2 denote the same parts as in FIG. 1, and a detailed description thereof will be omitted.

Referring to FIG. 2, the system comprises an image input unit 21 for inputting an image signal, an A/D converter 22, a black and white signal processing circuit 23 for reducing the data volume of digital image data supplied from the A/D converter 22, a color signal processing circuit 33 for converting digital image data supplied from the A/D converter 22 to have a signal format suitable for recording on a recording medium in a recording and reproducing unit 29 (to be described later), a selection switch 32, a versatile transmission path 24 such as a serial interface or the like having a low transmission rate, the recording and reproducing unit 29 such as a digital video tape recorder, a digital video disk, or the like for recording image data on a recording medium, and reproducing image data recorded on the recording medium, and a transmission signal processing circuit 34 for performing transmission rate conversion processing of the digital image data reproduced from the recording medium in the recording and reproducing unit 29 to match the transmission rate of the transmission path 24, and converting the digital image data to have a signal format suitable for transmission along the transmission path 24.

The digital image input system according to the first embodiment of the present invention will be described below with reference to FIG. 2.

Referring to FIG. 2, the operations executed when an analog image signal is input, an image represented by the input analog image signal is displayed on the display unit of the display device 8 of the personal computer system 50, and an operator arbitrarily records an image signal representing his or her desired scene of the input analog image signal on a recording medium while confirming the contents of the image will be explained below.

Referring to FIG. 2, the image input unit 21 inputs an analog image signal into the system.

As an image signal input to the image input unit 21, for example, when a video signal compatible with the NTSC television system is to be input, a video signal having 60 fields per second is input; when a video signal compatible with the PAL television system is to be input, a video signal having 50 fields per second is input.

Of the video signal input by the image input unit 21, a video signal for, e.g., one field is sampled by the A/D converter 22 at a sampling rate of about 640 samples in the horizontal direction×480 samples in the vertical direction, and each sample is analog-to-digital converted to have 8-bit or higher gradation characteristics for each of R, G, and B colors, thus forming digital image data. The formed digital image data is supplied to the black and white signal processing circuit 23 and the color signal processing circuit 33.

The black and white signal processing circuit 23 deletes color information data included in the digital image data supplied from the A/D converter 22, and converts only black and white image data to have a signal format suitable for transmission along the transmission path 24. The circuit 23 outputs the converted data to the selection switch 32. On the other hand, the color signal processing circuit 33 performs recording signal processing such as modulation, compression, and the like for the digital image data supplied from the A/D converter 22 so as to convert the digital image data supplied from the A/D converter 22 to have a signal format suitable for recording on the recording medium in the recording and reproducing unit 29, and outputs the processed data to the recording and reproducing unit 29.

The selection switch 32 is normally connected to the black and white signal processing circuit 23 side, and the black and white image data output from the black and white signal processing circuit 23 is supplied to the signal processing circuit 5 in the personal computer system 50 via the transmission path 24 such as a versatile serial interface such as an RS-232C with a low transmission rate. The signal processing circuit 5 performs processing such as demodulation for the received data, and temporarily stores the processed data in its internal memory. Thereafter, the stored data is read out from the memory, and is converted by the display interface 7 to have a signal format such as R, G, and B signals which can be displayed on the display device 8. Then, the converted signals are displayed on the display unit, comprising, e.g., a CRT, a liquid crystal display, or the like of the display device 8.

As described above, only the black and white image data is extracted by the black and white signal processing circuit 23 from the digital image data supplied from the A/D converter 22, and is supplied via the transmission path 24. For this reason, even when the transmission path 24 with a low transmission rate is used, since the image display rate of the display device 8 of the personal computer system 50 becomes greatly higher than that of the conventional system, the delay between the contents of the image represented by the image signal input to the system and the contents of the image displayed on the display device due to the difference between the transmission rate of the input image signal and the image display rate, which poses a problem in the conventional system, can be prevented, and the conventional problem can be solved in practice. Therefore, the operator can accurately confirm the contents of the image signal currently input to the system by observing the image displayed on the display device of the personal computer system.

The operator operates the operation unit 11 at the instance when his or her desired arbitrary scene is displayed while confirming the black and white image represented by the input analog image signal of the system, which is displayed in real time on the display device 8 of the personal computer system 50, thus issuing a start command of the recording operation for recording the currently input image signal on the recording medium to the CPU 6. The CPU 6 then outputs a command signal for instructing the start of the recording operation. The command signal is input to the recording and reproducing unit 29 via the command signal line 10, and the recording and reproducing unit 29 records the digital image data, which is supplied from the color signal processing circuit 33 and has been subjected to the recording signal processing, on the recording medium.

Note that the recording and reproducing unit 29 receives digital image data, which is not converted to have a signal format suitable for transmission along the transmission path 24, i.e., has a large information volume per field and a high transmission rate. However, the recording and reproducing unit 29 has a performance of recording digital image data for, e.g., one field in 1/60 seconds at high speed. For this reason, the digital image data supplied from the color signal processing circuit 33 is recorded on the recording medium at high speed.

The command signal, which is supplied from the CPU 6 via the command signal line 10 and is used for instructing the start of the recording operation, is also supplied to the selection switch 32. The selection switch 32 is switched to the transmission signal processing circuit 34 side simultaneously as the recording and reproducing unit 29 completes the recording operation of the digital image data or when a command signal is supplied form the CPU 6. As a result, the digital image data recorded on the recording medium by the recording and reproducing unit 29 is reproduced from the recording medium, and is converted to have a transmission rate and a signal format suitable for the transmission path 24 by the transmission signal processing circuit 34. The converted data is supplied to the signal processing circuit 5 in the personal computer system 50 via the selection switch 32 and the transmission path 24. The signal processing circuit 5 performs processing such as demodulation for the received data, and temporarily stores the processed data in its internal memory. Thereafter, the stored data is read out from the memory, and is converted to have a signal format such as R, G, and B signals, which can be displayed on the display device 8. Then, the converted data is displayed on the display unit such as a CRT, a liquid crystal display, or the like of the display device 8.

Since the transmission path 24 comprises one with a low transmission rate such as a versatile serial interface (e.g., an RS-232C), the transmission rate conversion processing performed by the transmission signal processing circuit 34 is one for lowering the transmission rate of the digital image data reproduced from the recording medium by the recording and reproducing unit 29.

In the display operation of a reproduced image performed after completion of the recording operation in this embodiment, since digital image data reproduced from the recording and reproducing unit 29 is transmitted at a low transmission rate via the transmission path 24, it is displayed at a low display rate on the display device 8 of the personal computer system 50. In this case, since the operator has already confirmed the contents of the image recorded on the recording medium as a black and white image before recording, the low display rate does not pose any practical problem since this display operation is performed to confirm whether or not the digital image signal representing a desired arbitrary scene is normally recorded on the recording medium.

As described above, the digital image input system of this embodiment can display the contents of a color dynamic image signal input to the system as a dynamic image having a practical display rate even when it uses a transmission path with a low transmission rate. For this reason, the operator can record his or her desired arbitrary scene on the recording medium while confirming the displayed dynamic image in real time, and can automatically confirm the recorded image after completion of the recording operation.

In the above-mentioned first embodiment, the color signal processing circuit 33 always supplies digital image data to the recording and reproducing unit 29, so that the recording and reproducing unit 29 can always perform a recording operation. However, with this arrangement, since electric power must always be supplied to the color signal processing circuit 33 and the recording and reproducing unit 29 to activate them, the consumption power of the system undesirably increases.

Figure 3:
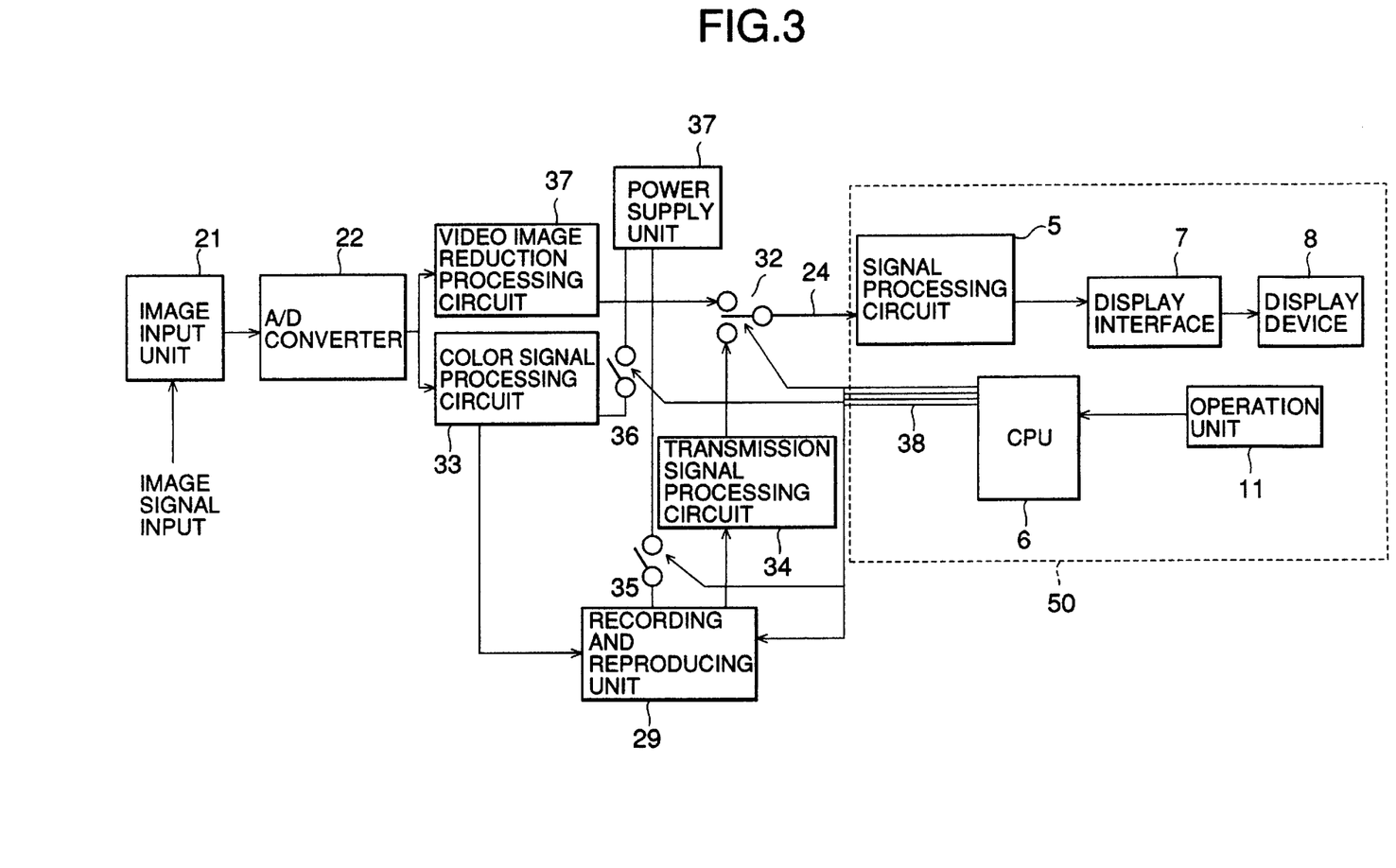
FIG. 3 is a schematic block diagram showing the arrangement of a digital image input system according to the second embodiment of the present invention.

FIG. 3 shows a digital image input system which is modified to solve the above-mentioned problem, as the second embodiment of the present invention.

Note that the same reference numerals in FIG. 3 denote the same parts as in FIGS. 2 and 1, and a detailed description thereof will be omitted.

In the arrangement shown in FIG. 3, when the operator operates the operation unit 11 to issue a start command of the recording operation to the CPU 6, the CPU 6 outputs a command signal for instructing the start of the recording operation, and the output command signal is input to switches 35 and 36 as well as to the recording and reproducing unit 29 and the selection switch 32 via a command signal line 38. These switches 35 and 36 change from an OFF state to an ON state upon reception of the command signal, and from this timing, electric power begins to be supplied from a power supply unit 37 to the color signal processing circuit 33 and the recording and reproducing unit 29. For this reason, the color signal processing circuit 33 and the recording and reproducing unit 29 can receive electric power from the power supply unit 37 when needed, thus saving the consumption power of the system.

In this embodiment, the switch 35 is normally set in the OFF state, and changes to an ON state upon reception of the command signal for instructing the start of the recording operation from the CPU 6, as described above. On the other hand, the switch 36 changes to an ON state upon reception of the command signal, and may change to an OFF state after the completion of the recording operation. In this case, in order to reproduce digital image data recorded by the recording and reproducing unit 29 after the completion of the recording unit, and to confirm the recording state of the recorded data by displaying an image represented by the reproduced digital image data on the display device 8 of the personal computer system 50, the recording and reproducing unit 29 must be kept activated. For this reason, after the completion of the recording operation, the switch 35 may be maintained in the ON state, and the switch 36 may be set in an OFF state after the completion of the above-mentioned display operation.

In the first and second embodiments described above, the black and white signal processing circuit 23 deletes color information data included in the digital image data supplied from the A/D converter 22, and outputs only black and white image data, thereby reducing the data volume of the digital image data and increasing the display rate of an image on the display device 8 of the personal computer system 50. However, depending on the performance of the transmission path or personal computer to be used (e.g., when the transmission rate of the transmission path to be used has a lower transmission rate or when the personal computer to be used has a low processing speed), the data volume must be further reduced to obtain a sufficient display rate of an image on the display device.

Figure 4:
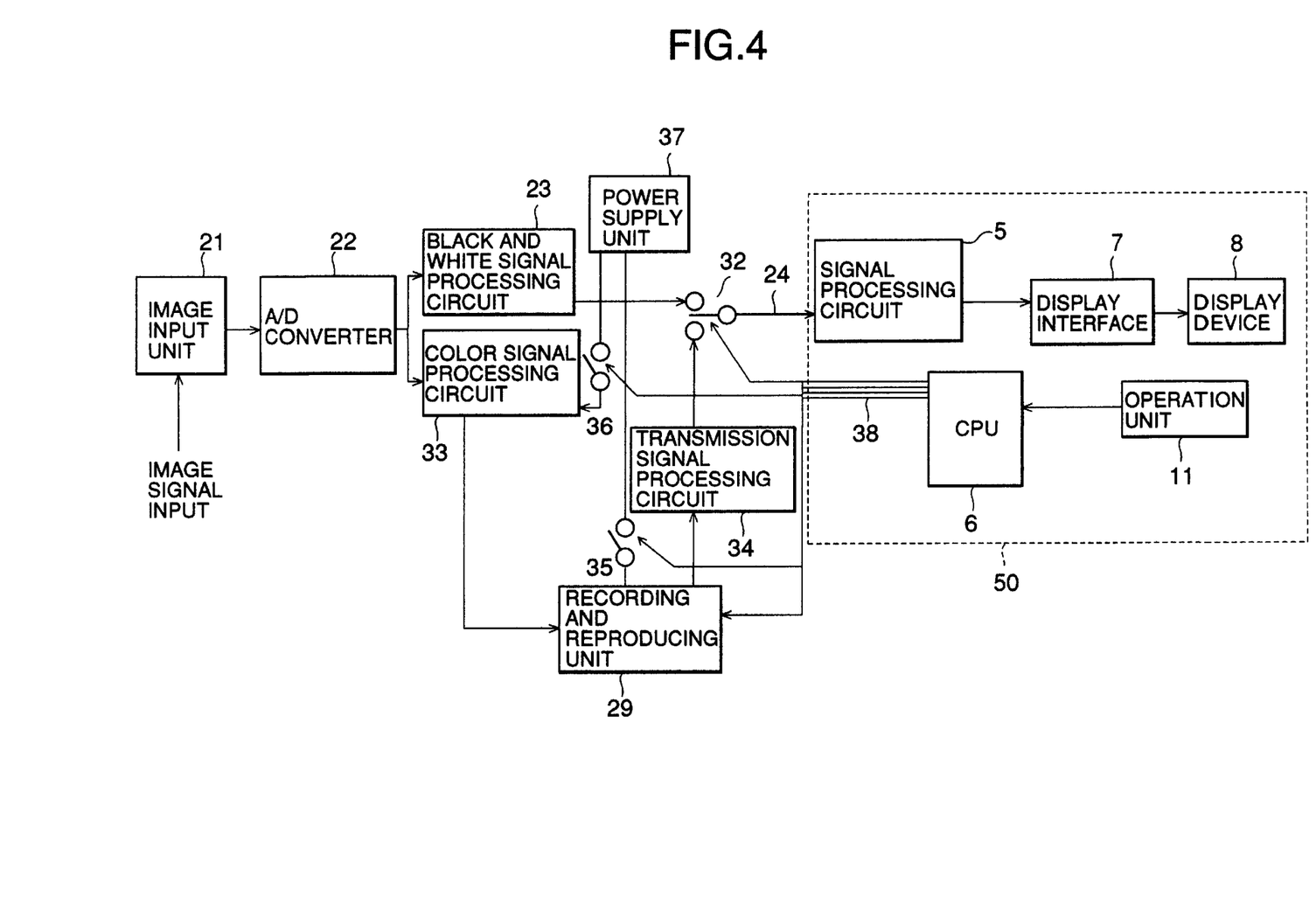
FIG. 4 is a schematic block diagram showing the arrangement of a digital image input system according to the third embodiment of the present invention.
Figure 5:
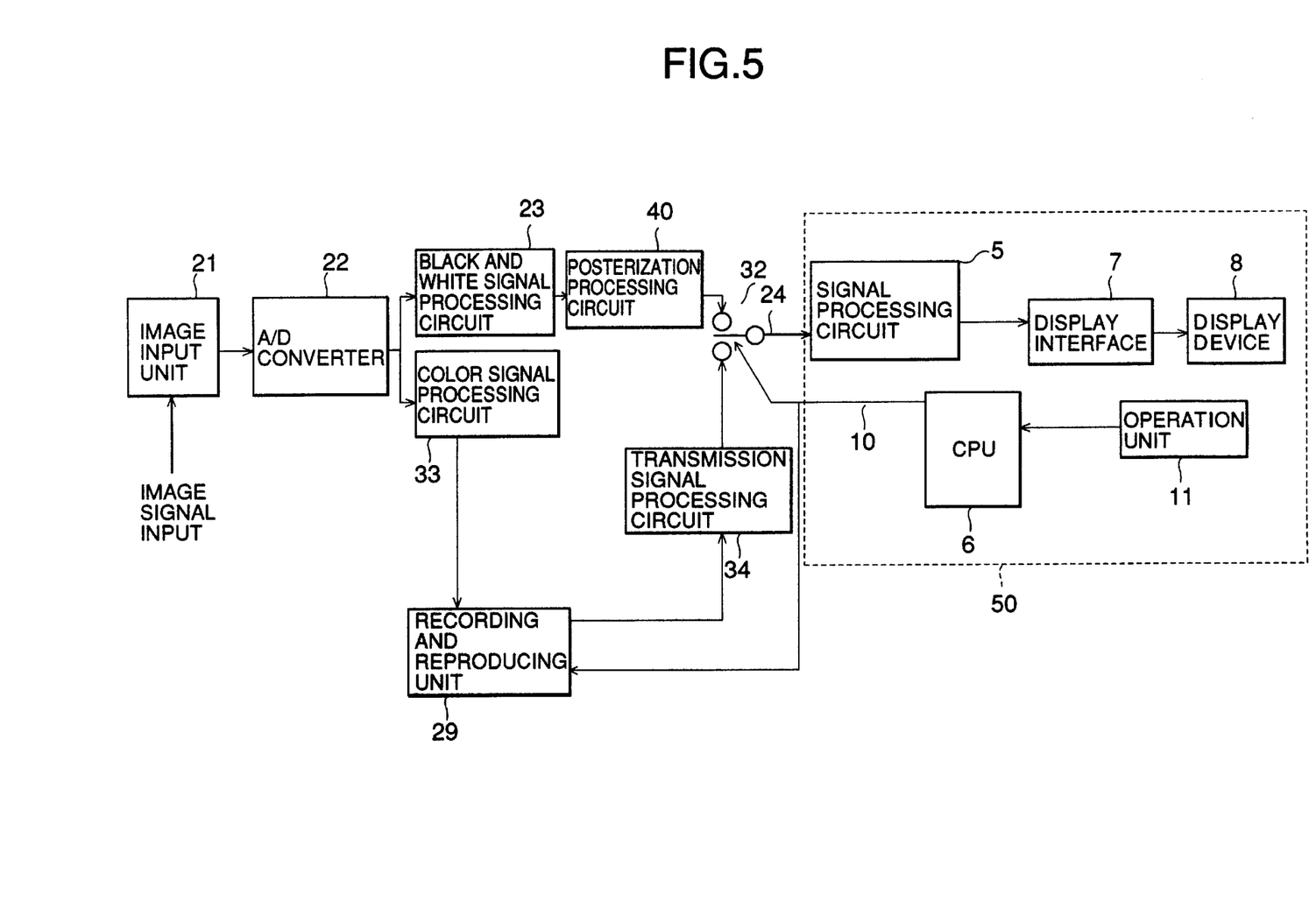
FIG. 5 is a schematic block diagram showing another arrangement of the digital image input system according to the third embodiment of the present invention.

FIGS. 4 and 5 show a digital image input system which is modified to solve the above-mentioned problem, as the third embodiment of the present invention.

Note that the same reference numerals in FIGS. 4 and 5 denote the same parts as in FIGS. 2 and 1, and a detailed description thereof will be omitted.

In the system shown in FIG. 4, a video image reduction processing circuit 39 is arranged in place of the black and white signal processing circuit 23 shown in FIG. 2 as signal processing for reducing the data volume of digital image data. The image reduction processing circuit 39 performs signal processing for reducing the size of an image represented by digital image data.

Note that the image reduction processing circuit 39 reduces the size for one field to, e.g., ½ or ⅓ by thinning out digital image data. Upon execution of the thin-out processing, if pixel data are merely thinned out, moire noise due to aliasing is generated in an image represented by digital image data subjected to the thin-out processing, resulting in deteriorated image quality. For this reason, band limitation is performed in advance for digital image data supplied from the A/D converter 22 using a low-pass filter, and thereafter, the thin-out processing of the data is performed.

As the signal processing for reducing the data volume of the digital image data, so-called posterization processing for obtaining pictorial color tones by decreasing the gradation characteristics expressed by 8 bits for each of R, G, and B colors to 4 bits for each of R, G, and B colors, line art processing for extracting only the edge portion of an image expressed by digital image data, and the like may be performed.

Also, as shown in the system of FIG. 5, a plurality of types of data volume reduction processing such as the black and white signal processing circuit 23 and a posterization circuit 40, may be combined to reduce the data volume of digital image data.

In the systems of the first to third embodiments described above, the image input unit 21 inputs an externally input analog image signal. However, as shown in FIG. 6, when the present invention is applied to a system comprising an image pickup unit such as a video camera, the operability can be further improved.

Figure 6:
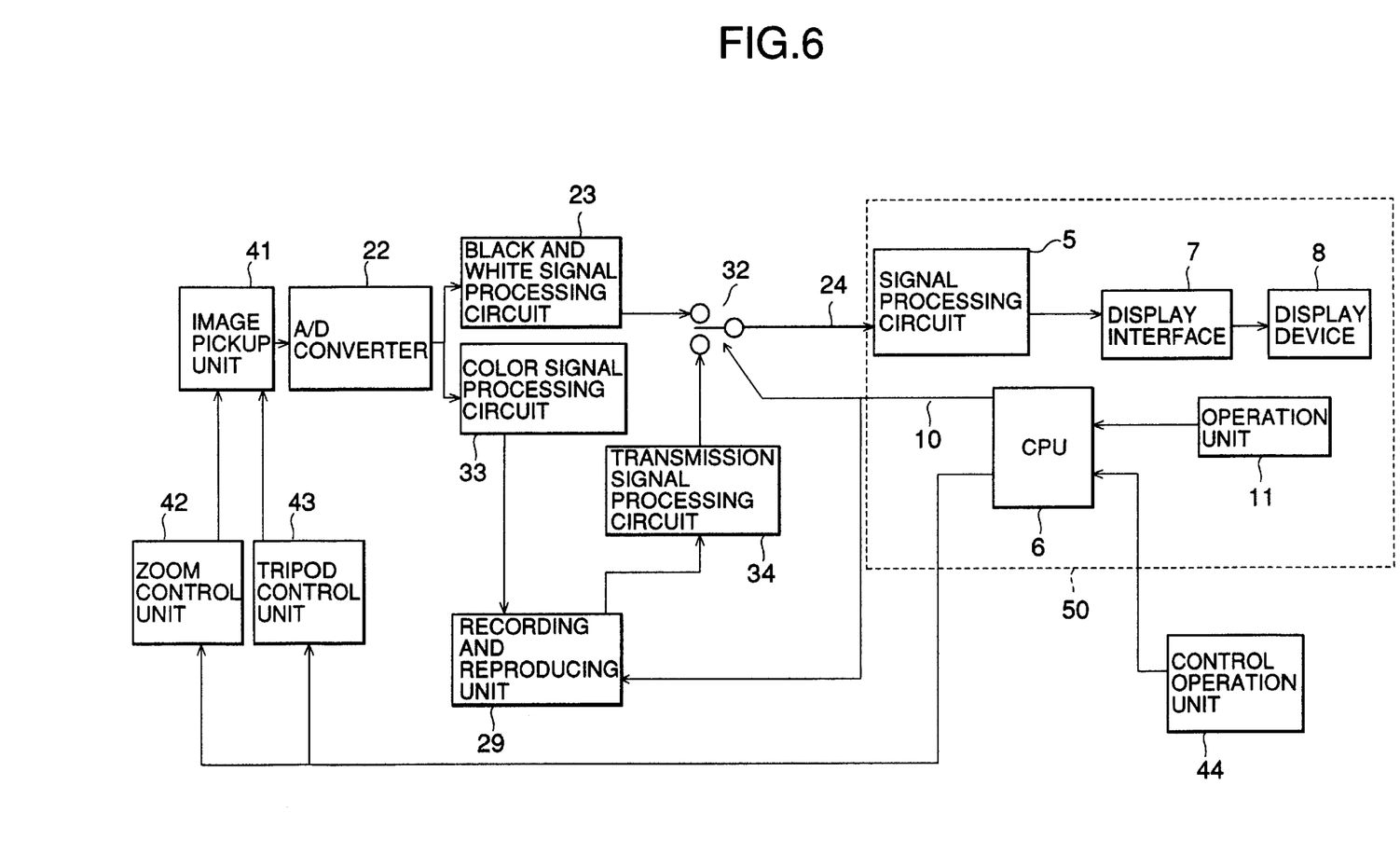
FIG. 6 is a schematic block diagram showing the arrangement of a digital image input system according to the fourth embodiment of the present invention.

FIG. 6 is a schematic block diagram of a digital image input system according to the fourth embodiment of the present invention. The system shown in FIG. 6 will be described below.

Note that the same reference numerals in FIG. 6 denote the same parts as in FIGS. 2 and 1 and a detailed description thereof will be omitted.

The digital image input system according to the fourth embodiment of the present invention shown in FIG. 6 comprises an image pickup unit 41 such as a video camera in place of the image input unit 21 in the system of each of the first to third embodiments. The image pickup unit 41 has one or both of an electric optical zoom system and an electric tripod, which can be externally controlled.

Upon image pickup by the image pickup unit 41, an analog image signal is generated and is supplied to the display device 8 of the personal computer system 50 via the same route as that in the system of the first embodiment, and a dynamic image represented by the analog image signal output from the image pickup unit 41 is displayed in real time on the display unit of the display device 8. The operator operates a control operation unit 44 while confirming the dynamic image displayed on the display unit of the display device 8 of the personal computer system 50.

A control command signal generated upon operation of the control operation unit 44 is supplied to a zoom control unit 42 and a tripod control unit 43 via the CPU 6. When the zoom control unit 42 and the tripod control unit 43 control the electric optical zoom system and the electric tripod, the zoom ratio of the optical zoom system is controlled so that an image within the range required by the operator can be picked up, and the pan/tilt state of the tripod is controlled so that an image of a portion, required by the operator, of an object can be picked up.

As described above, after the optical zoom system and the tripod of the image pickup unit 41 are adjusted, and the image pickup range and position required by the operator are determined, the operator operates the operation unit 11 at the instance when his or her desired arbitrary scene is displayed while confirming a black and white dynamic image represented by the analog image signal output from the image pickup unit 41 and displayed in real time on the display device 8 of the personal computer system 50, thereby starting a recording operation of the recording and reproducing unit 29 as in the system of the first embodiment.

In the case of this embodiment, since a dynamic image represented by an analog image signal output form the image pickup unit can be displayed at a high display rate on the display unit of the display device of the personal computer system, the adjustment operation of the optical zoom system and the tripod of the image pickup unit can be facilitated very much, thus further improving the operability.

Note that a black and white image is displayed on the display unit of the display device of the personal computer system in this embodiment. Since the above-mentioned adjustment operation can be sufficiently performed based on the black and white image, no practical problem is posed.

In the description of the first to fourth embodiments described above, the present invention is applied to the digital image input system, which uses a serial interface with a low transmission rate as a transmission path, supplies digital image data to the personal computer system via the transmission path, and displays a dynamic image represented by the digital image data on the display device of the personal computer system. As the transmission path with a low transmission rate, a telephone line may also be used.

Figure 7:
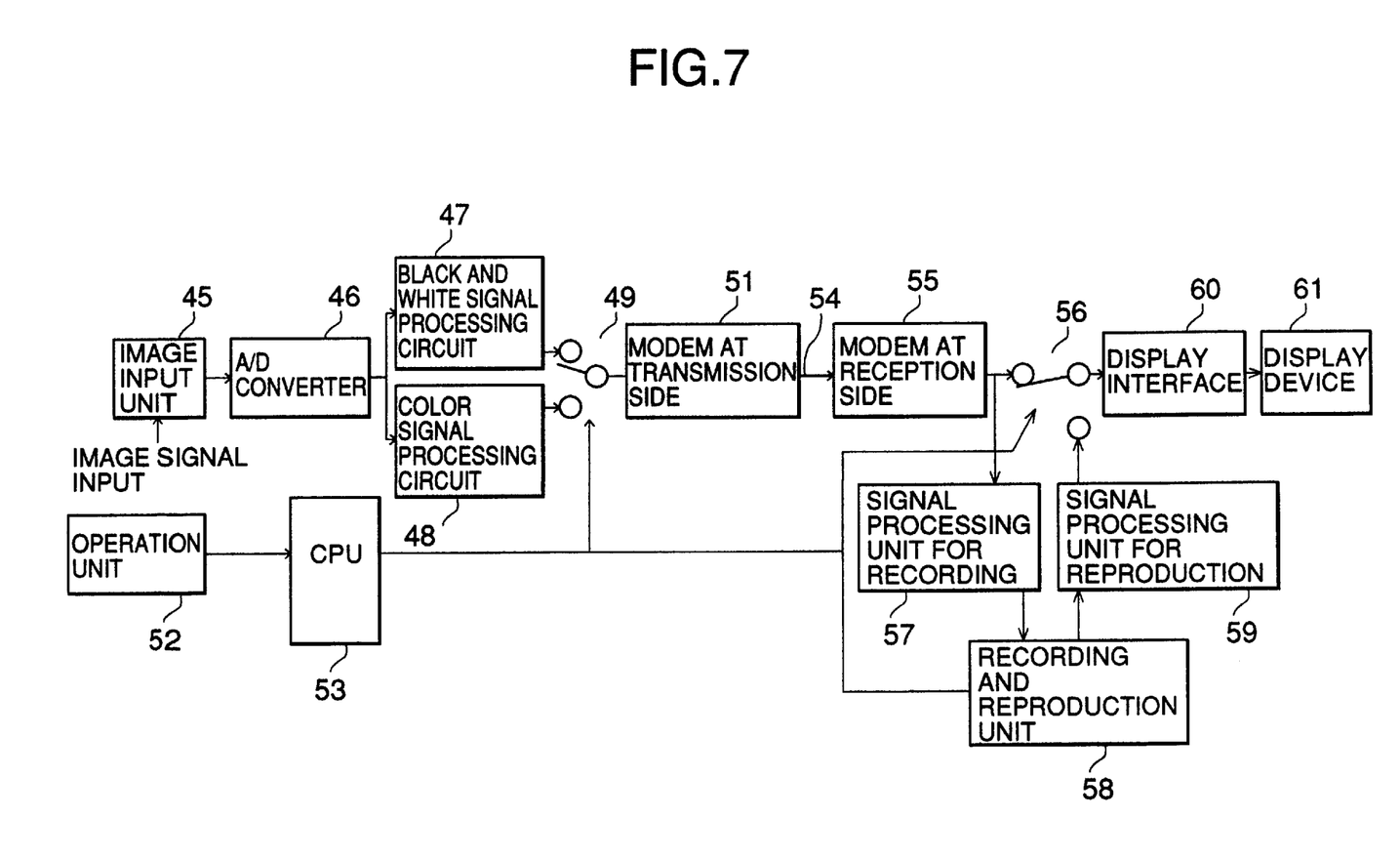
FIG. 7 is a schematic block diagram showing the arrangement of a digital image input system according to the fifth embodiment of the present invention.

FIG. 7 is a schematic block diagram of a television meeting system according to the fifth embodiment of the present invention.

Note that the television meeting system shown in FIG. 7 uses a telephone line with a low transmission rate as the transmission path.

Referring to FIG. 7, the system comprises an image input unit 45 for inputting an image signal, an A/D converter 46, a black and white signal processing circuit 47 for reducing the data volume of digital image data supplied from the A/D converter 46, a color signal processing circuit 48 for converting digital image data supplied from the A/D converter 46 to have a signal format suitable for a telephone line 54 (to be described later), a selection switch 49, a modem 51 at the transmission side for connecting a transmitting communication terminal apparatus to the telephone line as a transmission path, an operation unit 52 in the transmitting communication terminal apparatus, a CPU 53 in the transmitting communication terminal apparatus, the telephone line 54 as a transmission path with a low transmission rate, a modem 55 at the reception side for connecting a receiving communication terminal apparatus to the telephone line 54, a selection switch 56, a signal processing unit 57 for recording, a recording and reproducing unit 58 for recording/reproducing digital image data onto/from a recording medium, a signal processing unit 59 for reproduction, a display interface 60 for outputting a signal to a display device 61, and the display device 61 having a display unit such as a CRT, a liquid crystal display, or the like.

The operation of the television meeting system of this embodiment will be described below with reference to FIG. 7.

In the television meeting system shown in FIG. 7, when a dynamic image is transmitted from the transmitting communication terminal apparatus to the receiving communication terminal apparatus as a partner of the meeting via the telephone line with a low transmission rate, the image input unit 45 inputs an analog image signal at the transmitting communication terminal apparatus.

As an image signal input to the image input unit 45, for example, when a video signal compatible with the NTSC television system is to be input, a video signal having 60 fields per second is input; when a video signal compatible with the PAL television system is to be input, a video signal having 50 fields per second is input.

Of the video signal input by the image input unit 45, a video signal for, e.g., one field is sampled by the A/D converter 46 at a sampling rate of about 640 samples in the horizontal direction×480 samples in the vertical direction, and each sample is analog-to-digital converted to have 8-bit or higher gradation characteristics for each of R, G, and B colors, thus forming digital image data. The formed digital image data is supplied to the black and white signal processing circuit 47 and the color signal processing circuit 48.

The black and white signal processing circuit 47 deletes color information data included in the digital image data supplied from the A/D converter 46, and outputs only black and white image data to the selection switch 49. On the other hand, the color signal processing circuit 48 performs transmission rate conversion processing of digital image data supplied from the A/D converter to match the transmission rate of the telephone line 54 without reducing the data volume, and also performs processing such as noise reduction. The circuit 48 then outputs the processed data to the selection switch 49.

The selection switch 49 is normally connected to the black and white signal processing circuit 47 side, and black and white image data output from the black and white signal processing circuit 47 is converted by the modem 51 at the transmission side to have a signal format (e.g., an FM-modulated signal) suitable for transmission along the telephone line 54. The converted data is supplied to the modem 55 at the reception side via the telephone line 54 with a low transmission rate, and is subjected to processing such as demodulation by the modem 55 at the reception side. The processed data is supplied to the selection switch 56 and the signal processing unit 57 for recording.

The selection switch 56 is normally connected to the side of the modem 55 at the reception side, and the digital image data output from the modem 55 at the reception side is converted to have a signa format such as R, G, and B signals that can be displayed on the display device 61. The converted data is displayed on the display unit such as a CRT, a liquid crystal display, or the like of the display device 61.

As described above, of digital image data output from the A/D converter 46 in correspondence with an image signal input by the image input unit 45 of the transmitting communication terminal apparatus, only black and white image data is output from the black and white signal processing circuit 47, and is transmitted to the receiving communication terminal apparatus via the telephone line 54. For this reason, even when a telephone line with a low transmission rate is used, a black and white dynamic image is displayed at a display rate much higher than that in a case wherein digital image data including color information data is transmitted and displayed on the display device 61 of the communication terminal apparatus at the reception side, and its contents can be confirmed.

When a television meeting system is used, normally, attendants at the meeting are checked and they introduce themselves at the beginning of the meeting. At this time, since images and voices transmitted from the respective communication terminal apparatuses must match each other to prevent an unnatural state, an image must be displayed at a high display rate on the display device of each communication terminal apparatus.

To attain such high display rate, in the early stage of the meeting, black and white image data output from the black and white signal processing circuit 47 is selected by the selection switch 49, and is transmitted onto the telephone line 54, so that the display device of each communication terminal apparatus can display a dynamic image transmitted from the respective communication terminal apparatuses at a sufficiently high display rate, although the displayed image is a black and white one.

As described above, when the meeting starts and enters the main program, and the attendants discuss with reference to documents, references, drawings, and the like prepared by themselves, a high-resolution color image which has a larger information volume than black and white images must be transmitted so as to faithfully transmit images of the documents, references, drawings, and the like, since they can be still images.

For this purpose, when the meeting enters the main program, the operator, who is about to transmit the images of the documents, references, drawings, and the like, of a given communication terminal apparatus inputs a transmission image signal formed by utilizing, e.g., a picture camera device to the image input unit 45 of the communication terminal apparatus, and operates the operation unit 52, thus issuing a start command of a high-resolution still image communication to the CPU 53. Then, the CPU 53 supplies a switch selection command signal for selecting the color signal processing circuit 48 side to the selection switch 49, and the selection switch 49 is switched from the black and white signal processing circuit 47 side to the color signal processing circuit 48 side. As a result, the output from the color signal processing circuit 48 is connected to the modem 51 at the transmission side, and the modem 51 at the transmission side is connected to the modem 55 at the reception side in the receiving communication terminal apparatus. Furthermore, the output from the modem 55 at the reception side is connected to the selection switch 56 and the signal processing unit 57 for recording.

On the other hand, the switch selection command signal output from the CPU 53 is also supplied to the selection switch 56 of the receiving communication terminal apparatus. Upon reception of this signal, the selection switch 56 is switched from the modem 55 at the reception side to the signal processing unit 59 for reproduction.

The digital image data output from the color signal processing circuit 48 is converted by the modem 51 at the transmission side to have a signal format (e.g., an FM-modulated signal) suitable for transmission along the telephone line 54, and the converted data is supplied to the modem 55 at the reception side in the receiving communication terminal apparatus via the telephone line 54 with a low transmission rate. The data is subjected to processing such as demodulation by the modem 55 at the reception side. The processed data is supplied to the signal processing unit 57 for recording. In the signal processing unit 57 for recording, the digital data supplied from the modem 55 at the reception side is subjected to signal processing for recording such as modulation, compression, and the like so as to be converted to have a signal format suitable for recording on the recording medium, thus forming a recording signal. The formed recording signal is recorded on the recording medium by the recording and reproducing unit 58 as a recording signal of digital image data representing a high-resolution color still image with a large information volume.

Upon completion of recording of the recording signal output from the signal processing unit 57 for recording, the recording and reproducing unit 58 reproduces the recorded recording signal from the recording medium, i.e., restores digital image data representing an original high-resolution color still image with a large information volume. The reproduced image data is converted by the display interface 60 to have a signal format such as R, G, and B signals that can be displayed by the display device 61, and the converted data is displayed on the display unit such as a CRT, a liquid crystal display, or the like of the display device 61 of the receiving communication terminal apparatus.

As described above, when digital image data representing a high-resolution color still image with a large information volume and output from the color signal processing circuit 48 is to be transmitted via the telephone line 54, since the telephone line 54 has a low transmission rate, the data is transmitted at low speed. However, in the receiving communication terminal apparatus, the transmitted digital image data is temporarily recorded on the recording medium by the recording and reproducing unit 58, and upon completion of recording, the digital image data recorded on the recording medium is reproduced. Thereafter, the reproduced digital image data can be supplied to the display interface 60 at a high transmission rate without going through any transmission path with a low transmission rate. For this reason, the high-resolution color still image with a large information volume can be displayed in real time at a high display rate on the display device 61.

As described above, the attendants of the meeting can discuss the subject brought up in the meeting while observing, as common references, reproduced images of the documents, references, drawings, and the like, which are reproduced by the recording and reproducing unit 58 and are displayed as high-resolution color still images with a large information volume on the display device 61.

In this embodiment, as shown in FIG. 7, the arrangement that allows a unidirectional communication has been exemplified. In addition, a television meeting system that allows bidirectional communications can be realized by providing the arrangements at the transmission and reception sides shown in FIG. 7 to each communication terminal apparatus. In this case, since the modem and the like can be used for both transmission and reception, a cost reduction of the system can be attained.

As described above, the television meeting system of this embodiment can realize a very low-cost television meeting system without losing the original effects of the television meeting system even when a general telephone line with a low transmission rate is used.

In the first to fifth embodiments described above, as an analog image signal to be input, a video signal compatible with the NTSC or PAL television system is used. Also, the present invention may be applied to a system which inputs an image signal compatible with the HDTV system, and the like, thus obtaining the same effects as in the above embodiments.

As described above, according to the embodiments of the present invention, an image transmission apparatus, which can solve the conventional problems, can selectively transmit an image signal onto a transmission path at one of different arbitrary rates in correspondence with an application purpose or display mode independently of the transmission rate of the transmission path, can display an image represented by an image signal transmitted from a transmitting apparatus in real time, and can assure low cost, low consumption power, and good operability, can be provided.

What is claimed is:

1. An image transmission apparatus comprising:
   (A) image signal generation means for generating an image signal for one field at a first rate;
   (B) first transmission image signal forming means for forming a first transmission image signal on the basis of the image signal generated by said image signal generation means, and outputting the formed first transmission image signal for one field at a second rate lower than the first rate;
   (C) second transmission image signal forming means for forming a second transmission image signal having an information volume smaller than an information volume of the first transmission image signal on the basis of the image signal generated by said image signal generation means, and outputting the formed second transmission image signal for one field at a rate higher than the second rate; and
   (D) selective output means for selectively outputting one of the first transmission image signal output from said first transmission image signal forming means and the second transmission image signal output from said second transmission image signal forming means onto a transmission path.

2. An apparatus according to claim 1, wherein said first transmission image signal forming means includes rate conversion means for forming and outputting the first transmission image signal for one field by fetching the image signal for one field generated by said image signal generation means at the first rate, and outputting a signal corresponding to the fetched image signal for one field at the second rate.

3. An apparatus according to claim 1, wherein said first transmission image signal forming means includes storage means for forming and outputting the first transmission image signal for one field by storing the image signal for one field generated by said image signal generation means at the first rate, and outputting a signal corresponding to the stored image signal for one field at the second rate.

4. An apparatus according to claim 1, wherein said second transmission image signal forming means is arranged to form the second transmission image signal corresponding to a portion of an image represented by the image signal generated by said image signal generation means.

5. An apparatus according to claim 1, wherein said second transmission image signal forming means is arranged to form the second transmission image signal corresponding to an image having a smaller number of gradation levels than the number of gradation levels of an image represented by the image signal, on the basis of the image signal generated by said image signal generation means.

6. An apparatus according to claim 1, wherein said image signal generation means includes an image pickup unit for sequentially generating an image signal at the first rate.

7. An apparatus according to claim 1, wherein said transmission path includes a serial interface.

8. An apparatus according to claim 1, wherein said transmission path includes a telephone line.

9. An apparatus according to claim 1, wherein said first transmission image signal forming means is arranged not to output the first transmission image signal to said selective output means when said selective output means outputs the second transmission image signal output from said second transmission image signal forming means.

10. An apparatus according to claim 1, wherein the first transmission image signal includes a still image, and the second transmission image signal includes a dynamic image.

11. An apparatus according to claim 1, further comprising a display device for receiving one of the first and second transmission image signals transmitted via said transmission path, and displaying an image corresponding to one of the received first and second transmission image signals.

12. An apparatus according to claim 1, wherein said image signal generation means is arranged to sequentially generate a color image signal at the first rate.

13. An apparatus according to claim 12, wherein said second transmission image signal forming means is arranged to form the second transmission image signal representing a black and white image signal on the basis of the color image signal generated by said image signal generation means.

14. An image transmission apparatus comprising:
(A) image signal generation means for generating an image signal for one field at a first rate;
(B) first transmission image signal forming means for forming a first transmission image signal on the basis of the image signal generated by said image signal generation means, and outputting the formed first transmission image signal for one field at a second rate lower than the first rate;
(C) second transmission image signal forming means for forming a second transmission image signal having an information volume smaller than an information volume of the first transmission image signal on the basis of the image signal generated by said image signal generation means, and outputting the formed second transmission image signal for one field at a rate higher than the second rate;
(D) selective output means for selectively outputting one of the first transmission image signal output from said first transmission image signal forming means and the second transmission image signal output from said second transmission image signal forming means onto a transmission path;
(E) a transmission path for transmitting the transmission image signal output from said selective output means; and
(F) display means for displaying an image corresponding to one of the first and second transmission signals transmitted via said transmission path.

15. An apparatus according to claim 14, wherein said display means includes rate conversion means for forming and outputting the first transmission image signal for one field by fetching a signal corresponding to the first transmission image signal for one field transmitted via said transmission path at the second rate and outputting the fetched first transmission image signal for one field at the first rate, and is arranged to display an image corresponding to the first transmission image signal output from said rate conversion means.

16. An apparatus according to claim 14, wherein said display means includes storage means for forming and outputting the first transmission image signal for one field by storing a signal corresponding to the first transmission image signal for one field transmitted via said transmission path at the second rate and outputting the stored signal corresponding to the first transmission image signal for one field at the first rate, and is arranged to display an image corresponding to the first transmission image signal output from said storage means.

17. An apparatus according to claim 14, wherein said display means includes a personal computer having a display unit and an operation unit.

18. An apparatus according to claim 17, wherein said selective output means is arranged to selectively output one of the first transmission image signal output from said first transmission image signal forming means and the second transmission image signal output from said second transmission image signal forming means in accordance with an operation of the operation unit of said personal computer.

19. An apparatus according to claim 17, wherein said transmission path includes a serial interface.

20. An apparatus according to claim 17, wherein said image signal generation means includes a video camera for picking up an image of an object, and sequentially generating an image signal corresponding to the picked-up object image at the first rate.

21. An apparatus according to claim 20, wherein said video camera is arranged so that an image pickup range and angle thereof are controlled in accordance with an operation of the operation unit of said personal computer.

22. An image transmission apparatus comprising:
(A) first transmission image signal forming means for inputting an image signal on one picture basis, forming a first transmission image signal from the input image signal, and outputting the formed first transmission image signal of one picture at a first rate;
(B) second transmission image signal forming means for inputting the image signal on the one picture basis, forming a second transmission image signal having information amount less than that of the first transmission image signal from the input image signal, and outputting the formed second transmission image signal of one picture at a rate higher than the first rate; and
(C) selective output means for selectively outputting to a transmission line one of (i) the first transmission image signal output from said first transmission image signal forming means and (ii) the second transmission image signal output from said second transmission image signal forming means.

23. An apparatus according to claim 22, wherein said first transmission image signal forming means includes storing means for storing the image signal input on the one picture basis, forming the first transmission image signal by reading out the stored image signal of one picture at the first rate and outputting the formed first transmission image signal.

24. An apparatus according to claim 22, wherein the image signal is a color image signal.

25. An apparatus according to claim 22, wherein said second transmission image signal forming means is arranged so as to form, from the input color image signal, the second transmission image signal representing a monochromatic image signal.

26. An apparatus according to claim 22, wherein said second transmission image signal forming means forms, from the input image signal, the second transmission image signal corresponding to a portion of an image represented by the input image signal.

27. An apparatus according to claim 22, wherein said second transmission image signal forming means is arranged so as to form, from the input image signal, the second transmission image signal corresponding to an image having a gradient lower than that of an image represented by the input image signal.

28. An apparatus according to claim 22, wherein said transmission line includes a serial interface.

29. An apparatus according to claim 22, wherein said transmission line includes a telephone line.

30. An apparatus according to claim 22, wherein said first transmission image signal forming means is arranged so as to inhibit output of the first transmission image signal to said selective output means when said selective output means outputs the second transmission image signal.

31. An apparatus according to claim 22, wherein said first transmission image signal includes a still image signal, and wherein said second transmission image signal includes a moving image signal.

32. An apparatus according to claim 22, further comprising a display device for
   inputting the first and second transmission image signals transmitted through said transmission line, and
   displaying respective images corresponding to the input first and second transmission image signals.

33. An image transmission apparatus comprising:
   (A) first transmission image signal forming means for inputting an image signal on one picture basis, forming a first transmission image signal from the input image signal, and outputting the formed first transmission image signal of one picture at a first rate;
   (B) second transmission image signal forming means for inputting the image signal on the one picture basis, forming a second transmission image signal having an information amount less than that of the first transmission image signal and outputting the formed second transmission image signal at a rate higher than the first rate;
   (C) selective output means for selectively outputting one of (i) the first transmission image signal output from said first transmission image signal forming means and (ii) the second transmission image signal output from said second transmission image signal forming means;
   (D) a transmission line for transmitting the transmission image signal output from said selective output means; and
   (E) display means for displaying respective images corresponding to the first and second transmission image signals transmitted through said transmission line.

34. An apparatus according to claim 33, wherein
   said display means includes storing means for storing, at the first rate, the first transmission image signal transmitted through said transmission line on the one picture basis, and outputting the stored first transmission image signal of one picture, and
   said display means is arranged so as to display an image corresponding to the first transmission image signal output from said storing means.

35. An apparatus according to claim 33, wherein said display means includes a personal computer comprising a display unit and an operation unit.

36. An apparatus according to claim 35, wherein said selective output means is arranged so as to selectively output one of the first transmission image signal output from said first transmission image signal forming means and the second transmission image signal output from said second transmission image signal forming means, according to an operation of said operation unit of said personal computer.

37. An apparatus according to claim 33, wherein said transmission line includes a serial interface.

38. An image transmission method comprising:
   (A) a first transmission image signal forming step of inputting an image signal on one picture basis, forming a first transmission image signal from the input image signal, and outputting the formed first transmission image signal of one picture at a first rate;
   (B) a second transmission image signal forming step of inputting the image signal on the one picture basis, forming a second transmission image signal having information amount less than that of the first transmission image signal from the input image signal, and outputting the formed second transmission image signal of one picture at a rate higher than the first rate; and
   (C) a selective output step of selectively outputting to a transmission line one of the first transmission image signal output in said first transmission image signal forming step and the second transmission image signal output in said second transmission image signal forming step.

39. A method according to claim 38, wherein said first transmission image signal forming step includes the steps of storing the image signal input on the one picture basis and forming the first transmission image signal of one picture by reading out the stored image signal of one picture at the first rate.

40. A method according to claim 38, wherein the image signal comprises a color image signal.

41. A method according to claim 40, wherein said second transmission image signal forming step includes a step of forming, from the input color image signal, the second transmission image signal representing a monochromatic image signal.

42. A method according to claim 38, wherein said second transmission image signal forming step includes a step of forming, from the input image signal, the second transmission image signal corresponding to a portion of an image represented by the input image signal.

43. A method according to claim 38, wherein said second transmission image signal forming step includes a step of forming, from the input image signal, the second transmission image signal corresponding to an image having a gradient lower than that of an image represented by the input image signal.

44. A method according to claim 38, wherein said transmission line comprises a serial interface.

45. A method according to claim 38, wherein said transmission line comprises a telephone line.

46. A method according to claim 38, wherein said first transmission image signal forming step includes a step of inhibiting the outputting the first transmission image signal when, in said selective output step, the second transmission image signal is output.

47. A method according to claim 38, wherein the first transmission image signal is a still image signal, and the second transmission image signal is a moving image signal.

48. A method according to claim 38, further comprising a display step of
   inputting the first and second transmission image signal transmitted through said transmission line and
   displaying images corresponding respectively to the input first and second transmission image signals.

49. A method according to claim 48, wherein said display step includes the steps of
   storing, at the first rate, the first transmission image signal transmitted through said transmission line on the one picture basis,
   reading out a signal corresponding to the stored first transmission image signal of one picture, and
   displaying the image corresponding to the read-out first transmission image signal.

* * * * *

UNITED STATES PATENT AND TRADEMARK OFFICE
CERTIFICATE OF CORRECTION

PATENT NO. : 5,914,755
DATED : June 22, 1999
INVENTOR(S) : KAZUHIKO ITO ET AL.

It is certified that error appears in the above-identified patent and that said Letters Patent is hereby corrected as shown below:

COLUMN 2

Line 3, "unit 3" should read --unit 9--.

COLUMN 7

Line 13, "form" should read --from--.

COLUMN 10

Line 13, "form" should read --from--.

COLUMN 16

Line 5, "A n apparat us" should read --An apparatus--.

UNITED STATES PATENT AND TRADEMARK OFFICE
CERTIFICATE OF CORRECTION

PATENT NO.   :   5,914,755

DATED   :   June 22, 1999

INVENTOR(S)   :   KAZUHIKO ITO ET AL.

It is certified that error appears in the above-identified patent and that said Letters Patent is hereby corrected as shown below:

<u>COLUMN 18</u>

Line 49, "signal" should read --signals--.

Signed and Sealed this

First Day of February, 2000

*Attest:*

Q. TODD DICKINSON

*Attesting Officer*   *Acting Commissioner of Patents and Trademarks*